United States Patent

[11] 3,570,532

[72] Inventor  Nick Lendino
             125 Rhode Island Ave., Massapeque, N.Y.
             11758
[21] Appl. No. 865,424
[22] Filed    Oct. 10, 1969
[45] Patented Mar. 16, 1971
             Continuation-in-part of application Ser. No.
             791,385, Jan. 15, 1969, which is a
             continuation-in-part of application Ser. No.
             743,714, July 10, 1968, now abandoned.

[54] AUTOMATIC LIQUID LEVEL DETECTOR AND INDICATOR
     16 Claims, 10 Drawing Figs.
[52] U.S. Cl. .................................................. 137/558
[51] Int. Cl. ........................................... F16k 37/00
[50] Field of Search .................................. 307/118;
     317/(PL); 200/61.2, 84, 61.21, 153.19; 340/244
                            (A,B); 219/506, 519; 137/390/558

[56]              References Cited
                UNITED STATES PATENTS
2,377,330  6/1945  Dixon ............................. 200/84

| 2,905,783 | 9/1959 | Johnson | 200/84 |
|---|---|---|---|
| 2,907,844 | 10/1959 | Lindsey | 200/84 |
| 3,185,789 | 5/1965 | Gunther | 200/84 |
| 3,415,958 | 12/1968 | Mauro | 200/84 |

Primary Examiner—Henry T. Klinksiek
Attorney—Allison C. Collard

ABSTRACT: A level detector and indicator for mounting on a fuel oil supply tank, consisting of a housing having a shank which threadably engages into an already existing opening at the top of the tank and contains a float mounted on a sliding shaft which projects into the interior of the tank. The end of the sliding shaft within the housing is in contact with the plunger of a microswitch which is connected to the control system of an oil burner. When the oil in the tank drops below a predetermined level, the switch is opened to disconnect the oil burner from the system, and a warning light mounted on top of the housing turns on as an indication of the fuel oil level. The control system can then be manually reset by a switch mounted on top of the apparatus, so as to restart the oil burner. When a fuel delivery is made, the control system can be reactivated either manually or automatically.

Patented March 16, 1971
3,570,532
3 Sheets-Sheet 1
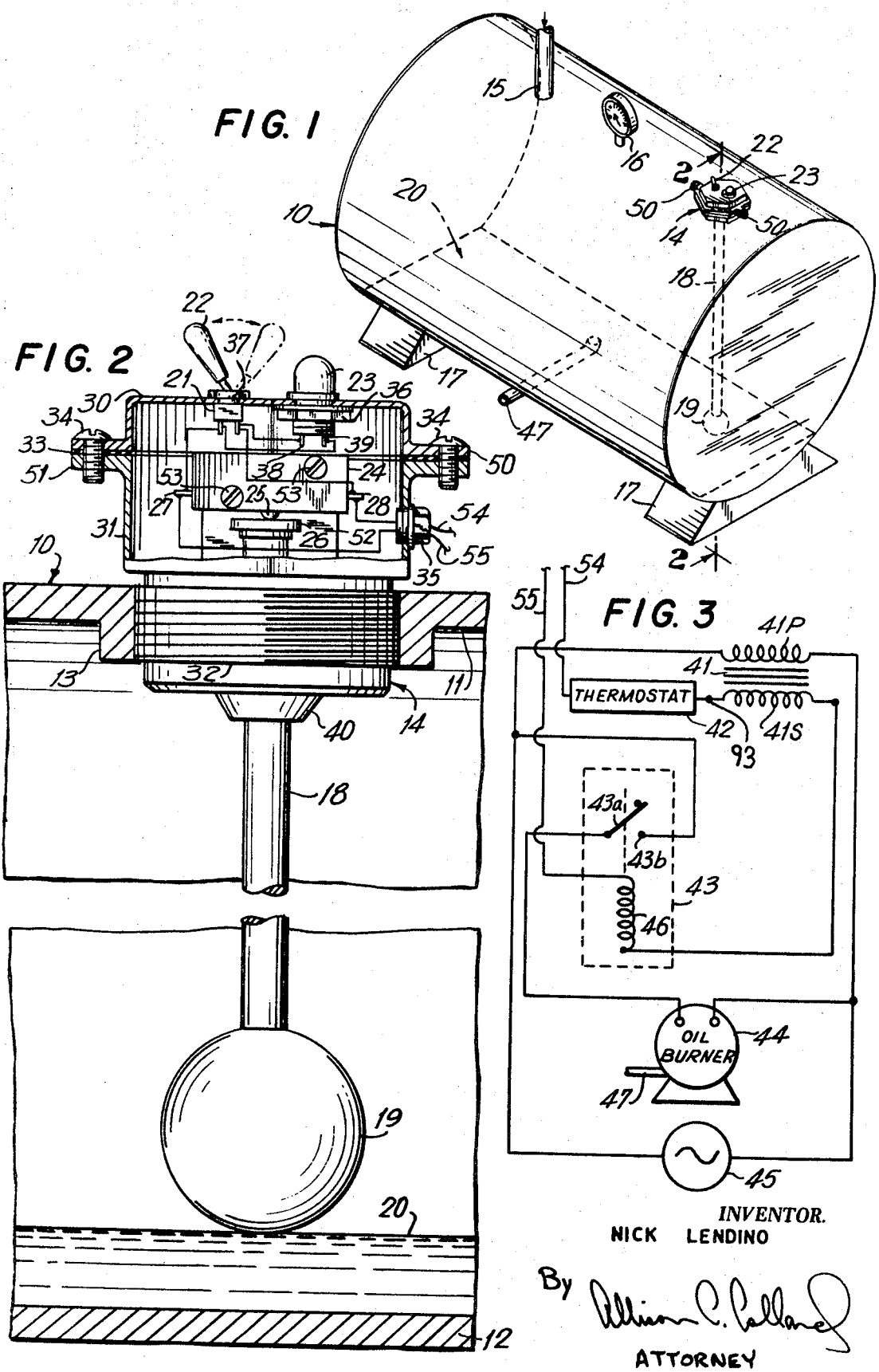
INVENTOR.
NICK LENDINO
By Allison C. Callan
ATTORNEY Patented March 16, 1971

INVENTOR.
NICK LENDINO

BY

*Allison C. Collard*
ATTORNEY

Patented March 16, 1971
3,570,532
3 Sheets-Sheet 3
FIG. 5
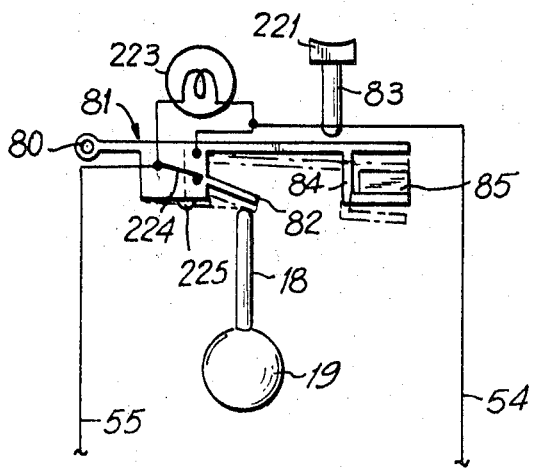
FIG. 6
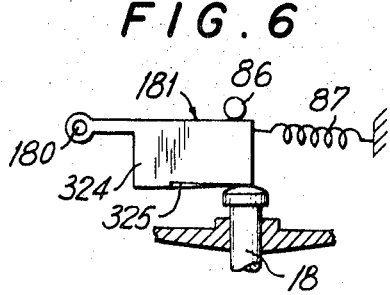
FIG. 7
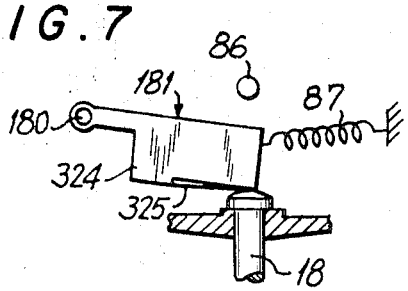
FIG. 8
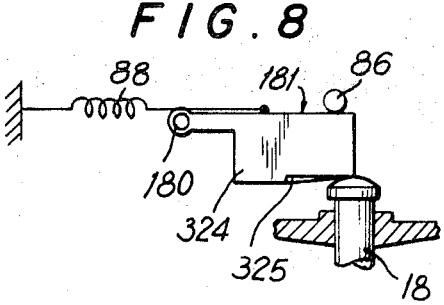
FIG. 10
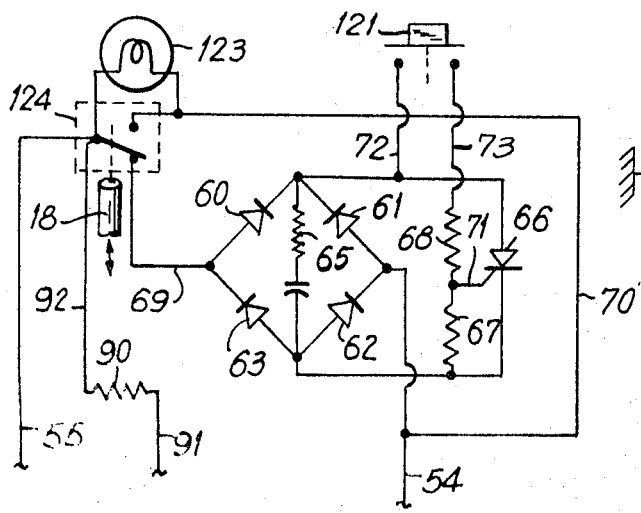
FIG. 9
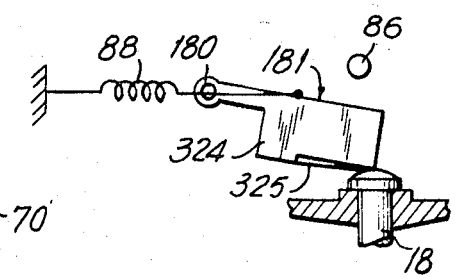
INVENTOR.
NICK LENDINO
BY
ATTORNEY

AUTOMATIC LIQUID LEVEL DETECTOR AND INDICATOR

This is a continuation-in-part application of application Ser. No. 791,385, filed on Jan. 15, 1969, which was a continuation-in-part application of application Ser. No. 743,714, filed Jul. 10, 1968, and now abandoned.

This invention relates to a level detector and warning indicator for use with fuel oil tanks.

More specifically, this invention relates to a fuel oil level detector and indicator which is connected to a fuel oil tank for sensing the level of the fuel oil in the tank and actuating a switch to provide an indication thereof when the fuel oil reaches a predetermined low level.

In household-heating systems which utilize oil as a source of fuel, a fuel oil tank is customarily found in the basement of the home for storage of large quantities of fuel oil. The owner of the home usually has a contract with a local fuel oil company to make automatic deliveries of fuel oil to the home as required. The fuel oil company determines the frequency of deliveries based on calculations of the weather and the size of the home. The deliveries are often scheduled when it is calculated that more than 60 to 70 percent of the capacity of the tank has been consumed by the oil burner. Occasionally, however, due to the weather or other factors, the calculations fail to keep pace with the consumption of the oil burner, and, as a result the supply of fuel oil in the home becomes exhausted. When notified by its customer, the fuel oil company must not only make an immediate delivery of oil but enter the customer's home to prime the oil burner pump and remove possible sediment deposits and sludge which have been drawn in by the oil burner from the bottom of the tank. The inconveniences that occur in restarting the oil burner often result in the loss of the customer to the fuel oil dealer.

Fuel companies attempt to schedule their deliveries as efficiently as possible so that the largest possible amount of fuel oil can be sold to the customer at any given time without the danger of having his supply become exhausted. By making larger quantity sales, it is possible for the fuel oil company to save costs by cutting down on the number of deliveries needed to service its customer. Under ideal conditions, fuel oil companies would like to make deliveries approximately 1 to 2 days before the oil tank runs dry. However, changes in climate and customer requirements often vary so extensively that it is impossible to calculate deliveries that will run to within a day or two of the ideal condition. Therefore, fuel oil delivery companies have to schedule their deliveries with a reasonable margin of safety to assure the continued and uninterrupted service of their customer's heating plant.

Accordingly, the present invention provides a level detection and indicating apparatus which permits fuel oil companies to schedule their deliveries closer to the day when the fuel oil supply will be exhausted without undue inconvenience to the customer. The apparatus of the invention is inserted into a flange opening at the top of a conventional fuel oil supply tank and is electrically connected to the oil burner controls. The apparatus includes a float which senses the fuel oil level within the tank so that when the oil drops to a predetermined low level, the apparatus will shut the oil burner off and turn on an indicating lamp at the top of the tank. The customer, upon sensing that his heating system is no longer operative and upon seeing the indicator lamp burning at the top of the tank, will notify the fuel oil company that a delivery is required. The customer may then operate a switch at the top of the apparatus to reconnect the oil burner back into its electrical control system. The supply of oil remaining in the tank will permit the oil burner to run approximately 2 or 3 days longer while delivery is anticipated. The apparatus of the invention prevents the customer's heating system from completely running out of oil and all of the inconveniences that are associated with restarting the oil burner. Therefore, by using the apparatus of the invention, fuel oil companies will be able to schedule their deliveries closer to the time of exhaustion of the customer's fuel oil supply without danger of losing the customer's business.

It is therefore an object according to the present invention to provide an apparatus for connection to a fuel oil tank which detects and indicates a predetermined low level of oil supply.

It is another object according to the present invention to provide a level and indicating apparatus which will turn off an oil burner prior to its running out of fuel.

It is still a further object according to the present invention to provide a fuel oil level detector and indicator which is simple in design, easy to manufacture, and inexpensive in cost.

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention as to which reference should be made to the appended claims.

In the drawings wherein similar reference characters denote similar elements throughout the several views:

FIG. 1 is a plan view partly in cross section of a fuel oil supply tank having the apparatus of the invention secured thereto;

FIG. 2 is a cross-sectional view of one embodiment of the apparatus taken through line 2-2 of FIG. 1;

FIG. 3 is an electrical schematic diagram showing the connection of the apparatus of FIG. 2 to the oil burner control system;

FIG. 5 is another embodiment of the invention utilizing a magnetic latch coupled to a switch control in contact with the liquid float;

FIG. 6 is still a further embodiment of the invention including a two position compression spring operated switch;

FIG. 7 shows the embodiment of FIG. 6 in its depressed condition;

FIG. 8 is another two position spring loaded embodiment utilizing a tension spring;

FIG. 9 shows the embodiment of FIG. 8 in its depressed condition; and

FIG. 10 is another embodiment of a solid state control circuit of the invention.

Figure 4:
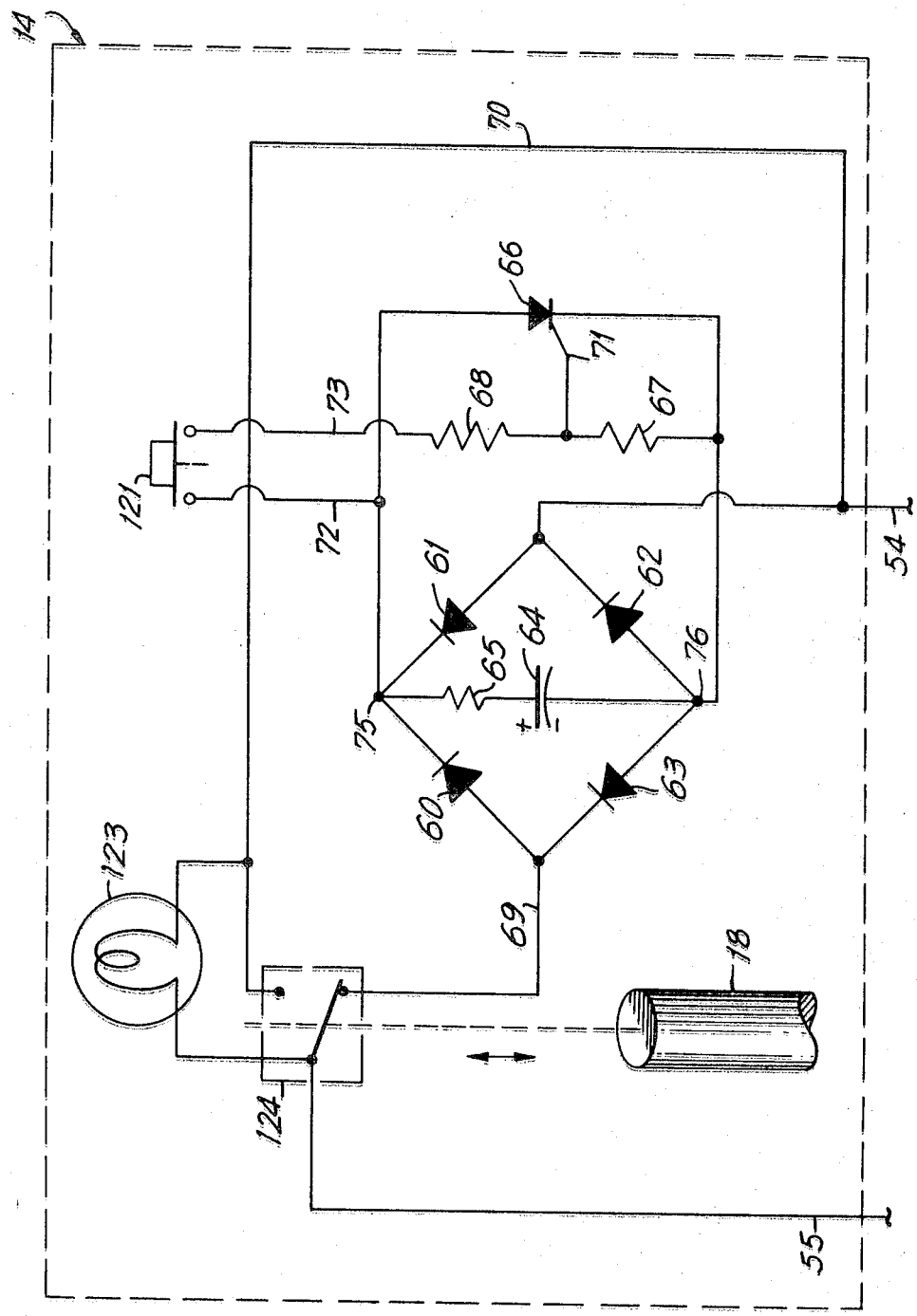
FIG. 4 is an electrical schematic diagram of another embodiment of the apparatus of FIG. 2.

Referring to FIG. 1, there is shown a plan view partly in cross section of a conventional fuel oil supply tank 10 which for the purposes of illustration has a 275-gallon capacity. The tank includes at its top portion a fill pipe 15 which is connected through an audible alarm system to the outside of the customer's house. At the center of the top portion of the tank is a gauge 16 which permits a visual but inaccurate determination of the level of the fuel oil in the tank. The top of tank 10 also normally includes a cap which is threadably engaged into a flange to permit the customer to have access to the internal portion of the tank. The cap, however, has been removed from the tank to permit the level detection and indicating apparatus 14 of the invention to be inserted therein.

Referring to FIG. 2, there is shown a detailed cross-sectional view of one embodiment of the apparatus which includes a hexagonally shaped housing 31 having disposed on its shank end a large helical thread 32 which corresponds in diameter and pitch to the thread of flange 13 at the top 11 of tank 10. Apparatus 14 also includes a hexagonally shaped corresponding cover member 30 which is bolted to housing 31 through extending flanges 50 and 51. Screws 34 pass freely through cover flanges 50 and threadably engage body flanges 51. A gasket 33, preferably constructed from neoprene, is disposed between the cover and the body to form a complete seal in all directions for the chamber which is formed within apparatus 14. Mounted on the top of cover 30 is a toggle switch 21 secured through the body of the cover by means of hexagonal nut 37. Switch 21 includes a handle 22, accessible from the top of the cover to permit manual adjustment of the switch to its on and off conditions. The top of cover 30 also includes an indicator light 23 which is visible from all directions and is secured to the cover by means of hexagonal nut 36. Within the chamber of apparatus 14 is a microswitch 24 secured to a vertical support 52 by means of screws 53. Support 52 is an integral part of housing 31 of apparatus 14.

At the bottom of apparatus 14 is contained a cone-shaped projection 40 which is an integral part of housing 31. Projection 40 is truncated at its end and includes an aperture for slidably receiving a float shaft 18 therethrough. At the bottom end of shaft 18 is attached a float 19 which has a density lighter than the oil 20 into which it is disposed. The top end of shaft 18 includes a pedestal 26 which is directed against plunger 25 of microswitch 24.

Terminals 38 and 39 of indicator light 23 are connected across the two terminals of switch 21. Each of the switch terminals are in turn connected across microswitch terminals 27 and 28. Terminals 27 and 28 of microswitch 24 are also connected to a two-wire conductor 55 which is brought out through housing 31 of apparatus 14, through a grommet 35 threadably engaged therein.

FIG. 3 is a simplified schematic diagram of the oil burner control system which is powered by 110-volt AC source 45. Connected across source 45 is the primary 41P of a voltage reduction transformer 41. Its secondary 41S, which typically produces 24 volts AC, has one terminal connected to coil 46 of oil burner relay 43. The other terminal of secondary 41S is connected to the input of thermostat 42. Thermostat 42 is customarily positioned at a remote location within the home and consists of a temperature sensing switch which activates the oil burner when the temperature in the home falls below a predetermined level. Normally, the opposite terminal of thermostat 42 is connected to the other terminal of relay coil 46 to complete the circuit of the secondary of transformer 41. However, because of the inclusion of apparatus 14, the other terminal of thermostat 42 is connected to conductor 54, while the other terminal of relay coil 46 is connected to conductor 55, so that the secondary circuit of transformer 41 is completed through apparatus 14. One terminal of oil burner 44 is connected to source 45 while its opposite terminal is connected to movable arm 43a of relay 43. Contact 43b is connected to the opposite terminal of source 45. Oil burner control relay 43 in its unenergized state is normally open circuited as shown to prevent oil burner 44 from completing its electrical circuit across source 45. Also shown, connected to oil burner 44, is a fuel feed line 47 which typically extends along the basement floor of the home for connection to the bottom of tank 10 as shown in FIG. 1. The schematic diagram of FIG. 3 has been simplified by leaving out other oil burner accessories, such as delayed starting, low water cutoff, and ignition devices in order to more easily explain the concept of the invention.

In typical fuel oil supply tanks, such as those having capacities of 275 gallons, it has been found desirable to shut off the oil burner when the level of the oil approaches six inches from the bottom (12) of tank 10. This will still leave about 2 to 3 days supply of oil when the oil burner is restarted. Therefore, shaft 18 of apparatus 14 can be designed with a length sufficient to extend float 19 to within a 6-inch level at the bottom of the tank. When the oil 20 is above that level, it will cover float 19 so that the buoyant force will urge shaft 18 upward and depress plunger 24 of microswitch 24 to maintain the contacts of the switch in an electrically closed position. Float 19 is designed sufficiently large so that its buoyancy will overcome the weight of shaft 18 and the spring force necessary to depress plunger 25.

When apparatus 14 is in operation and tank 10 is filled above its predetermined low level, microswitch 24 maintains the secondary circuit of transformer 41 in a closed electrical condition so that thermostat 42 controls the operation of oil burner 44. Toggle switch 21 on top of apparatus 14 is normally maintained open. When the oil in the tank drops to a predetermined low level, such as six inches from bottom 12, float 19 will become uncovered sufficiently to cause the positive action of plunger 25 to open microswitch 24 and interrupt the secondary circuit of transformer 41. With toggle switch 21 open, substantially all of the voltage from the secondary of transformer 41 will appear across lamp 23 due to the low impedance of relay coil 46. Lamp 23 will then light and serve as one indication that the heating plant has been shut down. The home owner will also be physically reminded of this condition from the lack of heat and hot water in the house. The home owner may then throw handle 22 of toggle switch 21 into its "on" position, as shown in dotted line, so as to bypass microswitch 24 and complete the secondary circuit of transformer 41. Lamp 23 will then extinguish, as the oil burner will continue operating using the reserve level remaining in the tank. This reserve level will give the home owner sufficient time to notify the fuel oil company and receive a delivery before the reserve fuel oil is exhausted. After receiving a delivery, switch handle 22 of toggle switch 21 is then manually returned to its normal position as shown in FIG. 2.

Referring to FIG. 4, there is shown another embodiment of the invention utilizing a bridge rectifier and silicon control rectifier in place of a portion of a circuit shown in FIG. 2, contained within indicating apparatus 14. The apparatus of FIG. 4 provides an automatic means of resetting indicator 14 by replacing manual switch 21 with a momentary contact switch 121 and rearranging the electrical circuitry.

In this second embodiment of the invention, when oil 20 in FIG. 2 drops below its minimum safe level, float 19 releases the plunger of microswitch 124 to interrupt the current within the secondary winding 41S of transformer 41, thermostat 42, and relay coil 46 (FIG. 3). Indicator light 123 which is connected across a pair of contacts of switch 124 will then light. The resistance of lamp 123 is designed sufficiently high so that the current through the lamp and relay coil 46 of relay 43 will not be sufficient to close contact 42a across 43b. In the construction of a prototype model of the invention, the current required to close relay 43 was found to be 0.5 amperes, while the current required to light lamp 123 was less than 10 percent of the relay pull-in current, or 0.040 amperes.

With the movable contact of relay 43 in open position as shown in FIG. 4, oil burner 44 will be disconnected from power source 45, and indicator light 123 will be lighted to show an insufficient fuel oil supply. With switch 124 in its normally open position, line 55 will be connected through the contact of the switch to line 69 at the input of a full wave bridge rectifier containing diodes 60, 61, 62 and 63. Line 54 is also connected to the opposite input of bridge rectifier 60—63 so that with thermostat 42 in its closed position, the potential of secondary winding 41S will be connected across the inputs of the bridge rectifier. With the arrangement of the diodes 60—63 as shown in FIG. 4, the negative DC potential will appear at terminal 76 while the positive potential of the bridge rectifier will appear at terminal 75. A resistor 65 and a capacitor 64 are connected across DC output terminals 76 and 75 in order to filter the DC potential. This DC potential produced at terminals 75 and 76 will be applied across the anode terminals of silicon control rectifier (SCR) 66. In addition, positive terminal 75 is connected to line 72 through the normally open contacts of switch 121, and through line 73 into the series combination of resistors 68 and 67. The gate terminal 71 of silicon control rectifier 66 is connected between the resistors. Silicon control rectifier 66 remains in a nonconductive state since no signal has yet been applied to its gate terminal 71.

When momentary switch 121 is closed across lines 72 and 73, a positive potential for terminal 75 is connected through resistor 68 to gate terminal 71 of SCR 66. SCR 66 will then begin to "fire", or conduct and remain in a conductive state even after switch 121 is released, so long as a DC potential remains across terminals 75 and 76 of bridge rectifier 60—63. When SCR 66 is turned on, a low resistance or short circuit condition exists between conductors 54 and 55 (through bridge rectifier 60—63) so as to complete the circuit of transformer secondary 41S of transformer 41 and thus energize relay coil 46, and extinguish lamp 123. This circuit condition will restore normal control to thermostat 42 of oil burner 44, while the oil in tank 10 remains below its minimum level.

When tank 10 is refilled with oil, float 19 will cause rod 18 to close the plunger of microswitch 124 so as to mechanically close the transformer secondary circuit of the oil burner system. This will remove bridge rectifier input 69 from the transformer secondary circuit. This will turn off the DC potential of the output of bridge rectifier 60—63, and turn off SCR 66. The advantage of this second embodiment of FIG. 4 over the first embodiment of FIG. 2 is that control and indicating circuit 14 is automatically reset by an oil delivery to tank 10, rather than by manually throwing switch 22 as previously described.

The body portion and cover of apparatus 14 can be constructed from zinc or molded from plastic materials. Shaft 18 and float 19 can be constructed from polystyrene. Float 19 may be hollow in design so as to have a density considerably lighter than oil 20. All of the components of the apparatus are readily available at low cost and can be inexpensively assembled so that the apparatus can be sold and installed at low cost.

Referring to FIG. 5, there is shown a magnetic latch embodiment of the invention wherein switch 224, which is similar to switches 24 and 124 is mounted on a lever 81 which is pivoted at point 80. The suspended end of lever 80 is split into a rectangular opening 84 which surrounds a magnet 85. Lever 81, or at least its internal surfaces surrounding magnet 85 are constructed from a paramagnetic metal such as iron, nickel, cobalt and the like, so that magnet 85 will magnetically retain lever 81 in one position or another.

The end of shaft 18 on float 19 contacts plunger 225 of switch 224, as well as arm 82 of lever 81. When the liquid level of the tank (not shown) falls below a predetermined level, the end of shaft 18 becomes disengaged from plunger 225 and arm 82. The moving contact arm of switch 224 assumes the position as shown in FIG. 5 so that the power across lines 55 and 54 will cause indicator lamp 223 to light. Switch 223 also interrupts the heating system in a manner similar to that described with respect to FIGS. 1—4. In order to restart the heating equipment, button 221 is depressed so as to push down onto the top portion of lever 81. This will cause lever 81 to move downward so that stationary magnet 85 will release its hold from the bottom surface of opening 84, and engage and hold the top surface of that opening. Arm 82 of lever 81 will again contact the end of shaft 18 and plunger 225 will be depressed to close switch 224 thereby turning off indicator light 223 and restarting the heating system. The gap of opening 84 is designed sufficiently wide so that plunger 225 of switch 224 and arm 82 will remain in contact with the end of shaft 18 even if float 19 reaches the bottom of the tank.

When the liquid level of the tank is restored, the buoyant force of float 19 on shaft 18 will urge arm 82, and thus lever 81 to overcome the magnetic force of magnet 85 on opening 84 so that lever 81 will return to its position as shown in heavy line in FIG. 5. The magnetic latch feature of this embodiment permits the liquid level warning system to be automatically reset when the liquid level of the tank is restored.

In FIGS. 6 and 7, a spring latch version of the invention is shown wherein switch 324, which is similar to switches 24, 124 and 224, is mounted on lever 181, which is pivoted at point 180. A compression spring 87 is connected to the free end of lever 181, and urges the lever to assume an upper position, as shown in FIG. 6, or a lower position as shown in FIG. 7. Thus when the liquid level drops below a predetermined level so that the end of shaft 18 becomes disengaged from plunger 325 of switch 324, compression spring 87 will hold lever 181 in its uppermost position. In order to restart the heating system, button 86 can be depressed against lever 181 causing it to spring into its lowermost position as shown in FIG. 7, so that plunger 325 establishes contact with shaft 18. Switch 324 will then be closed so as to restart the heating system. When the liquid is restored, the end of shaft 18 will push against the body of lever 181 and force it to resume its uppermost position as shown in FIG. 6.

Referring to FIGS. 8 and 9, there is shown still another embodiment of a switch type two position latch wherein a tension spring 88 is coupled to lever 181 along its top edge. Spring 88 passes adjacent to pivot point 180 of lever 181 so that the lever will assume either of two stable positions as illustrated in FIGS. 8 and 9. In a manner similar to that described with respect to the embodiment of FIGS. 6 and 7, after the liquid level drops below a predetermined level, button 86 may be depressed to force lever 181 into its lowermost position so that plunger 325 of switch 324 will again be depressed against the end of shaft 18. This will close switch 324 so as to reactivate the heating system.

When the liquid level in the tank is restored, the buoyant force of float 19, urging against shaft 18, will cause the end of shaft 18 to force lever 181 to its uppermost position as shown in FIG. 8 so as to reset the indicating system of the invention.

Referring to FIG. 10, there is shown a solid state version of the invention which is similar to that with respect to the embodiment described in FIG. 4 and further includes an additional conductor 91 connected through resistor 90 to line 92 which is connected to line 55. Resistor 90 is connected between thermostat 42 and secondary 41S to terminal 93 as shown in FIG. 3.

When the liquid falls below its predetermined level so that the end of shaft 18 causes switch 124 to open and light indicator lamp 123, the heating system will cease to operate. When switch 121 is depressed, a potential is applied to the gate terminal of silicon control rectifier (SCR) 66 which is derived through line 71 from the positive output terminal of full wave bridge rectifier 60—63. SCR 66 will then begin to conduct and remain conductive as long as a potential is maintained between its anode and cathode terminals. When in its conductive condition, SCR creates a short circuit or low resistance path between conductors 54 and 55 so as to complete the circuit involving secondary transformer 41S and restart the heating system. Lamp 123 will thus be extinguished and normal control will be restored to the thermostat. In the circuit of FIG. 4, if reset button 121 is depressed at a time when the thermostat is open, as might happen during the summer, or when the room temperature is high, there will be no potential applied to the SCR device, so that the SCR will not conduct. With the addition of the third conductor in FIG. 10 with resistor 90 connected to terminal 93, SCR 66 will remain "turned on" or conductive when reset button 121 is depressed, regardless of the setting of the thermostat.

When the liquid level is restored in the tank, shaft 18 will once again depress the plunger of switch 124 to automatically reset the indicating system to its original condition. When switch 124 is reclosed, the potential across SCR 66 will be interrupted so that the indicating system will be ready to detect a further low liquid indication in the tank.

The apparatus of the invention therefore prevents the inconveniences of running out of fuel oil by warning the home owner well in advance that another delivery of oil is required. The apparatus also permits fuel oil companies to schedule their deliveries further apart without the danger of losing their customers as a result of running out of oil.

While only a few embodiments of the present invention have been shown and described, it will be understood that many changes and modifications may be made thereunto without departing from the spirit and scope of the invention as defined by the appended claims.

I claim:

1. A level detection apparatus for use on a liquid reservoir for disconnecting an electrical apparatus from its power source when said liquid drops to a predetermined level comprising:

a housing secured over the reservoir;

a shaft slidably coupled through and disposed below said housing;

a float connected to one end of said shaft for contact with said liquid;

switch means secured to said housing and having its actuator in contact with the other end of said shaft; and at least one reset switch coupled to said switch means so that when said electrical apparatus is connected through said switch means to its power source, the circuit of said apparatus will be interrupted when said shaft trips the actuator of said switch means below a predetermined liquid level, and reset by said at least one reset switch when the liquid level rises above the predetermined level.

2. The apparatus as recited in claim 1 wherein said switch means additionally comprises an indicator having its terminals connected across the terminals of said switch means.

3. The apparatus as recited in claim 2 wherein said housing comprises a hollow hexagonal member having a threaded shank portion in threadable engagement to said liquid reservoir, and a cover for enclosing said hollow member and for containing said indicator and said switch means.

4. The apparatus as recited in claim 3 wherein said indicator is a lamp visible in all directions from said cover.

5. The apparatus as recited in claim 4 wherein said electrical apparatus comprises an oil burner having its relay control circuit in series connection across the terminals of said switch means.

6. The apparatus as recited in claim 5 wherein said liquid reservoir is a fuel oil tank having said housing threadably engaged to a flange opening in said tank.

7. The apparatus as recited in claim 1 wherein said switch means additional comprises:
rectifier means coupled across the terminals of said switch means;
semiconductor switch means coupled across the output of said rectifier means; and
wherein said at least one reset switch comprises a momentary switch means connected from one output of said rectifier means to the input of said semiconductor switch means so that actuation of said momentary switch means will close said semiconductor switch means to reconnect the electrical apparatus to its power source.

8. The apparatus as recited in claim 7 wherein said rectifier means comprises a diode bridge rectifier having a DC filter coupled across its output terminals.

9. The apparatus as recited in claim 1 wherein said semiconductor switch means is a silicon control rectifier having its anode and cathode terminals connected across the output of said bridge rectifier and having its input gate coupled to said momentary switch means.

10. The apparatus as recited in claim 8 wherein said semiconductor switch means is a silicon control rectifier having its anode and cathode terminals connected across the output of said bridge rectifier and having its input gate coupled to said momentary contact switch, a thermostat in series connection with said electrical apparatus and its power source, and a conductor connected between said thermostat and said switch means to maintain said silicon control rectifier operature.

11. The apparatus as recited in claim 1 wherein said switch means additionally comprises:
a lever for pivotably supporting said switch means for actuator contact with said shaft end;
means for maintaining said lever in a first position for actuator contact with said shaft end, and a second noncontacting position; and
wherein said at least one reset switch moves said lever from said second position to said first position.

12. The apparatus as recited in claim 11 wherein said lever comprises a paramagnetic metal member having a gap at its free end, and said maintaining means comprises a magnet disposed in said gap for magnetic contact with two opposite sides of said gap.

13. The apparatus as recited in claim 11 wherein said maintaining means comprises a compression spring urged against said lever.

14. The apparatus as recited in claim 11 wherein said maintaining means comprises a tension spring connected in tension to said lever.

15. The apparatus as recited in claim 11 wherein said at least one reset switch comprises a push button in contact with said lever.

16. The apparatus as recited in claim 1, wherein said reset switch means comprises a toggle switch mounted on said housing and connected across the terminals of said push switch means.